(12) United States Patent
Slatter

(10) Patent No.: US 7,706,631 B2
(45) Date of Patent: Apr. 27, 2010

(54) METHOD AND APPARATUS FOR PROCESSING IMAGE DATA

(75) Inventor: David Neil Slatter, Bristol (GB)

(73) Assignee: Hewlett-Packard Development Company, L.P., Houston, TX (US)

( * ) Notice: Subject to any disclaimer, the term of this patent is extended or adjusted under 35 U.S.C. 154(b) by 1042 days.

(21) Appl. No.: 11/407,366

(22) Filed: Apr. 20, 2006

(65) Prior Publication Data

US 2006/0239592 A1    Oct. 26, 2006

(30) Foreign Application Priority Data

Apr. 23, 2005    (GB) .................................. 0508224.3

(51) Int. Cl.
*G06K 9/36*    (2006.01)
*G06K 9/54*    (2006.01)

(52) U.S. Cl. ...................... 382/284; 382/305

(58) Field of Classification Search ................. 382/284, 382/294–298, 305; 358/1.12, 1.17, 1.18, 358/403; 715/769, 770, 788, 799, 800; 707/104.1
See application file for complete search history.

(56) References Cited

U.S. PATENT DOCUMENTS

| | | | |
|---|---|---|---|
| 6,288,719 B1 | 9/2001 | Squilla et al. | |
| 2003/0160824 A1* | 8/2003 | Szumla | 345/769 |
| 2005/0002061 A1 | 1/2005 | Uchida et al. | |

* cited by examiner

*Primary Examiner*—Yon Couso

(57) ABSTRACT

A method of processing image data representing a plurality of images, the method includes processing the image data for respective ones of the images in order to generate allocation data for each image, and on the basis of the allocation data, allocating an image a position in a template, the template includes a plurality of image windows, each window representing a template position; and on the basis of user input, generating selection data representing a user selected allocated image, and for an unselected allocated image, replacing that image with another image from the plurality of images.

15 Claims, 4 Drawing Sheets

METHOD AND APPARATUS FOR PROCESSING IMAGE DATA

CLAIM TO PRIORITY

This application claims priority to co-pending United Kingdom utility application entitled, "Method and Apparatus for Processing Image Data" having serial no. GB 0508224.3, filed Apr. 23, 2005, which is entirely incorporated herein by reference.

FIELD OF THE INVENTION

The present invention relates to the field of image data processing, and more specifically to a method and apparatus for generating and displaying an image montage.

BACKGROUND

Capturing and collecting images, whether still or video, is commonly used to maintain memories of events, people etc. With the advent of digital image and video capture, an image repository may contain many hundreds or thousands of images and/or video clips. The prior art is thus replete with disclosures which teach of organisation methods for images. A common method is for images to be stored and organised in 'albums' or 'boxes', either electronically or otherwise. Other forms of organisation exist. For example, a collection of images may be arranged into a montage, and electronic photo montage organisational systems are known, as well as more conventional photo-montage albums.

Constructing a photo montage is, however, time consuming, and even the electronic versions which can use templates still require a significant investment in terms of the time spent by a user in arranging images in a pleasing and desired manner using such a template. For example, a small collection of 15 images can be arranged in approximately 15! (15 factorial) ways with a fixed template, and without cropping of individual images. Hence, electronic montage image organisation systems in which images are 'clicked and dragged' into desired positions are time consuming to use effectively, which can thus detract from the positive experience of arranging images.

Other systems, such as that disclosed in U.S. Pat. No. 6,288,719 attempt to alleviate the problem by providing low resolution sticker sheets onto which high resolution images are arranged by hand on a template page, and subsequently scanned into a computer system. A high resolution image montage is produced according to the positioning of the low resolution stickers. The solution is, however, still relatively time consuming, and is not practicable for digital images.

Other solutions more appropriate for digital images involve the use of rule driven systems. The systems automatically arrange a set of images into a montage using a set of rules which are arranged to categorise and/or rank images based on certain image attributes such as size, content, saliency etc. The systems do not however exploit the knowledge of the user, and so any information relating to the images in this regard is lost. For example, a user may associate two or more images with each other, and wish to place these close by in a montage—a rule based system would not be aware of this, and the link could therefore be lost.

Other, less sophisticated electronic arrangement systems exist, in which images are permitted to be swapped around by a user for example. This is still a time consuming process when the choice of images is large, and can detract from the overall experience.

SUMMARY OF THE PRESENT INVENTION

According to a first aspect of the present invention, there is provided a method for processing image data representing a plurality of images, the method comprising processing the image data for respective ones of the images in order to generate allocation data for each image, on the basis of the allocation data, allocating an image a position in a template, the template comprising a plurality of image windows, each window representing a template position, and on the basis of user input, generating selection data representing a user selected allocated image, and for an unselected allocated image, replacing that image with another image from the plurality of images.

According to a second aspect of the present invention there is provided a method for generating an image montage, the method comprising allocating respective ones of images from a plurality of images in an image set to respective positions within windows of a montage template, determining if any allocated images are to be maintained in the montage, and selecting any such images, and on the basis of the determination, replacing an unselected image in the montage with an image from the image set.

According to a third aspect of the present invention there is provided a computer program product for use with a computer, said computer program product comprising a computer useable medium having computer executable program code embodied thereon, wherein said product is operable, in association with said computer, to allocate respective ones of images from a plurality of images in an image set to respective positions within windows of a montage template, determine if any allocated images are to be maintained in the montage, and select any such images, and on the basis of the determination, replace an unselected image in the montage with an image from the image set.

BRIEF DESCRIPTION OF THE FIGURES

For a better understanding of the present invention, and to further highlight the ways in which it may be brought into effect, various embodiments will now be described, by way of example only, with reference to the following drawings in which.

DETAILED DESCRIPTION

Figure 1:
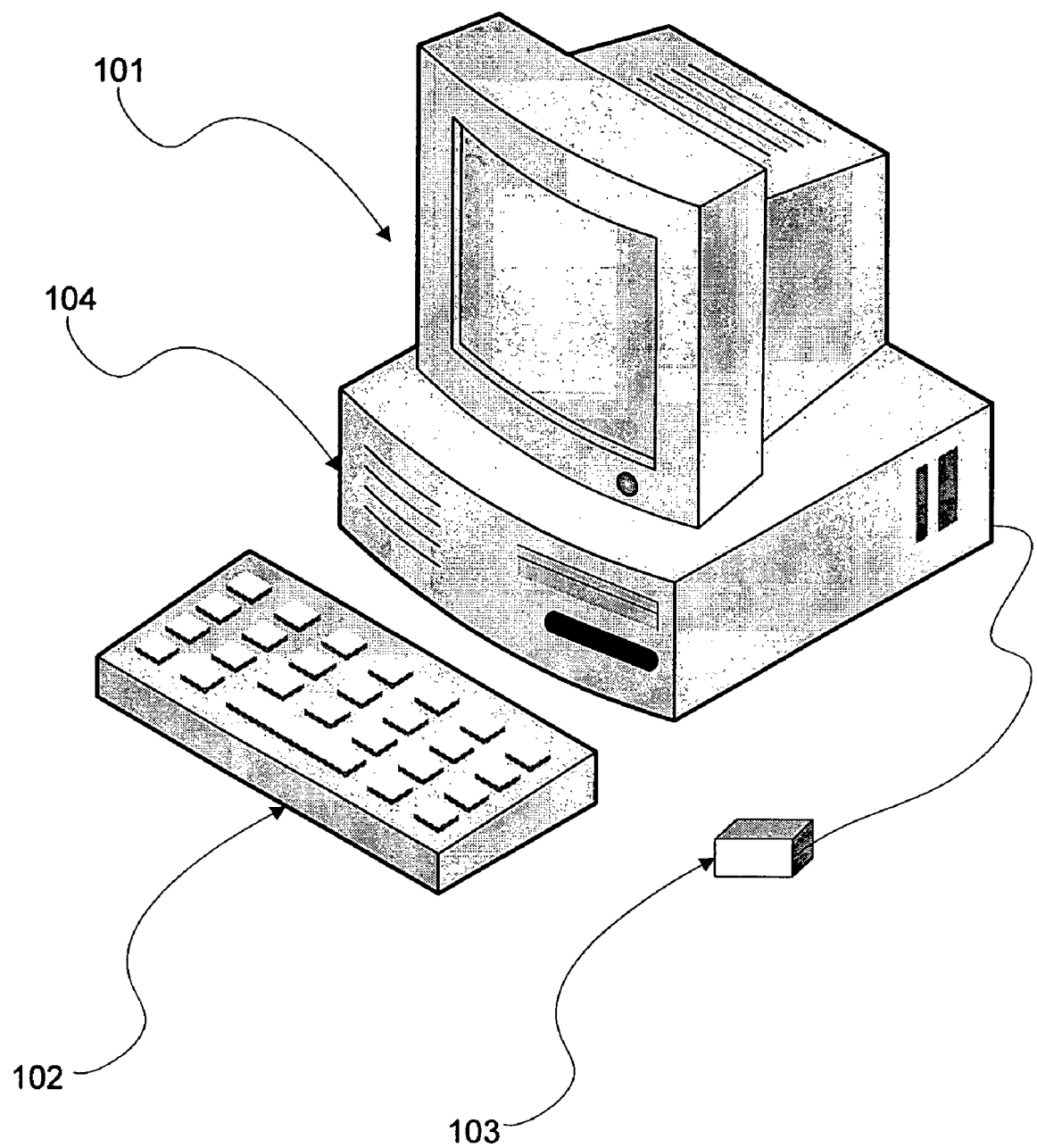
FIG. 1 is a schematic representation of an exemplary computer system for use in accordance with an embodiment.

FIG. 1 is a schematic representation of an exemplary computer system 100 for use in accordance with an embodiment. The system 100 comprises a display 101, and one or more input devices 102, 103 such as a mouse or keyboard for example. Other alternatives are possible, such as the display 101 being touch sensitive thereby permitting input, or that the system 100 includes some form of speech recognition functionality for input. Other alternatives are possible and the above is not intended to be limiting.

System 100 further comprises a main processing unit 104 which can include one or more microprocessors, memory such as dynamic random-access memory (DRAM) which can include either non-volatile memory (e.g. flash, ROM, PROM, etc.) and/or removable memory (e.g. memory cards, disks, etc. Other alternatives are possible. It will be appreciated by those skilled in the art that although system 100 has been depicted as comprising a number of distinct elements such as the display 101, input devices 102, 103, and main processing unit 104, it can be an integrated device such as a laptop computer, or mobile device such as a mobile telephone, PDA or the like.

Figure 2:
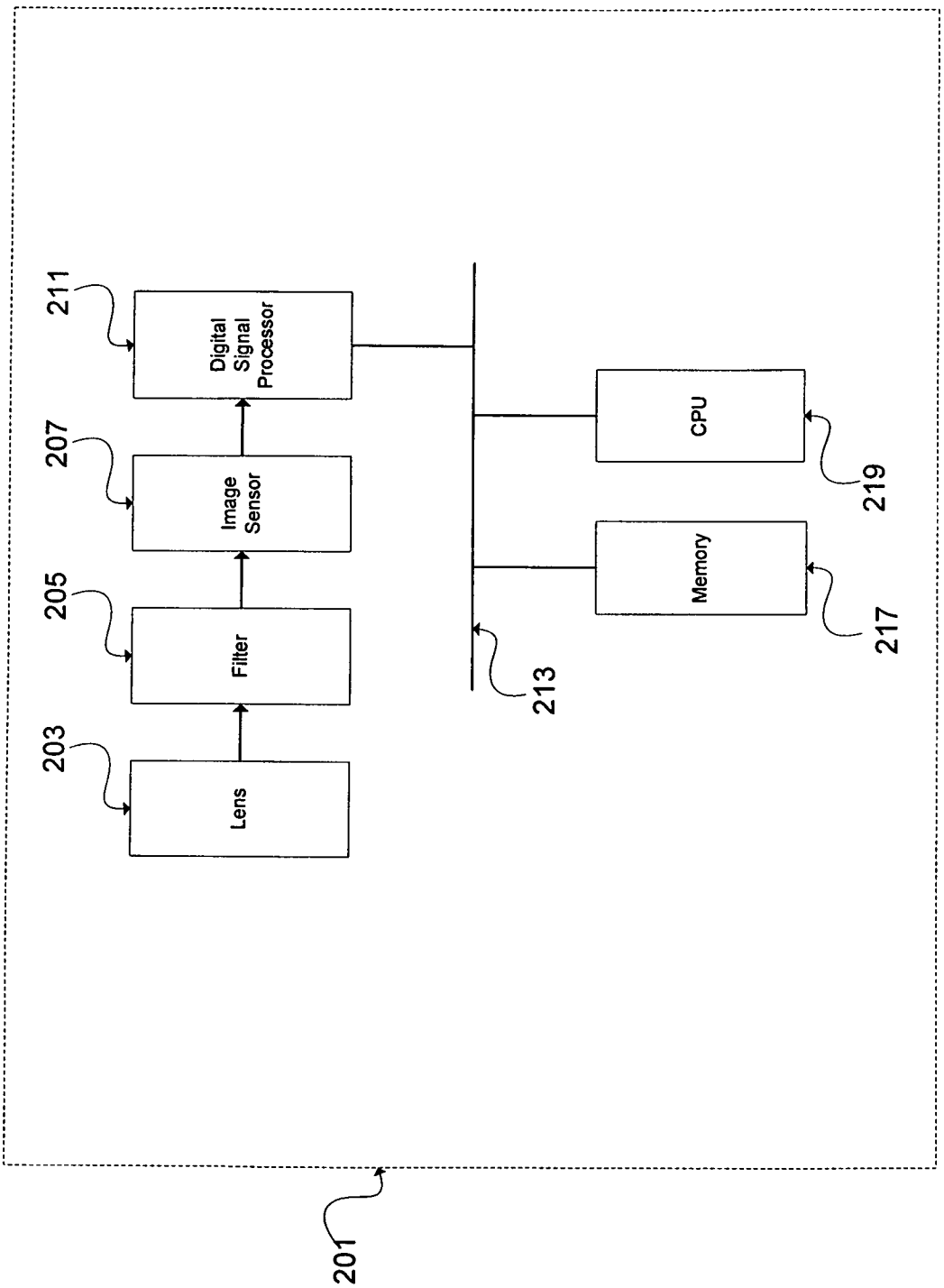
FIG. 2 is a schematic representation of an image capture device.

An image capture device 201 as shown in FIG. 2 comprises a lens assembly 203, a filter 205, image sensor 207, and a digital signal processor 211. An image or scene of interest is captured from light passing through the lens assembly 203. The light may be filtered using the filter 205. The image is then converted into an electrical signal by image sensor 207 which could be either of the devices mentioned above. The raw image data is then passed to the digital signal processor (DSP) 211.

Further, with reference to the device 201 of FIG. 2, a bus 213 is operable to transmit data and/or control signals between the DSP 211, memory 217, and the central processing unit (CPU) 219.

Memory 217 may be dynamic random-access memory (DRAM) and may include either non-volatile memory (e.g. flash, ROM, PROM, etc.) and/or removable memory (e.g. memory cards, disks, etc.). Memory 217 may be used to store raw image digital data as well as processed image digital data. CPU 419 is a processor operable to perform various tasks associated with the device 201.

It should be noted that there are many suitable alternative different configurations for the device of FIG. 2. In one embodiment, the CPU 219 and the DSP 211 may reside on a single chip, for example. In other embodiments, the CPU 219 and DSP 211 reside on two or more separate chips, for example. Further combinations are possible, but it should be noted that the exact architecture of the device 201 and/or the components therein as outlined above are not intended to be limiting. The device of FIG. 3 can be integral to a mobile device such as a mobile telephone or PDA for example, and can form part of the system 100 of FIG. 1.

According to an embodiment, images captured using a device such as that described with reference to FIG. 2 are stored or uploaded in a memory of system 100. The system has preloaded in a memory portion thereof, software according to an embodiment. Alternatively, functionality according to an embodiment can be encoded into hardware of device 100 such as in ROM or EPROM for example. A template is displayed to a user of the system on display 101. The template comprises a plurality of windows in a specific arrangement and of specific sizes and dimensions. More specifically, the windows can be of the same shape and dimensions, or can vary in shape and/or dimensions.

Initially, images loaded onto the system 100 are allocated to windows using a set of rules or randomly. In this regard, allocation can mean displaying an image in a window, or associating an image with a particular window for later display, or generating data representative of a window of a template into which an image is to be allocated. The set of rules can be part of the software, or can be downloaded from a network such as the internet for example, and/or can be user specified or adjusted. In general, the use of such rules in order to perform an allocation of images in the windows of a template is known. Such rules can use, for example, the date of capture of an image and/or the content of an image (as determined using known techniques) and/or the dimensions of an image and/or a unique marker in a header of an image file (such as metadata relating to an image for example) and/or the location of capture as determined using a GPS system of a camera for example. Other alternatives are possible, and the above is not intended to be limiting. For example, allocation can be random.

No rules need be used in order to allocate images, other than one which specifies that an image should be chosen at random for allocation. An additional rule can be used in order to avoid placing the same image in the template twice or more for example.

The user of the system can chose which rules are to be used, if any, or the system can automatically allocate images based on the set of rules, perhaps using user preference as a guide— for example, the system can determine which rules, if any, a user has chosen on previous occasions, and, on the basis of the determination, use a similar or the same set of rules. Alternatively, the system can determine a set of rules to use based on an indication or selection by a user of a 'theme' image. For example, a user can specify an image for use as a theme for a montage, and other images allocated to a montage can be selected by the system using the theme image as a guide. In any event, a plurality of captured images is allocated to a set of windows of a template, randomly or otherwise.

Figure 3:
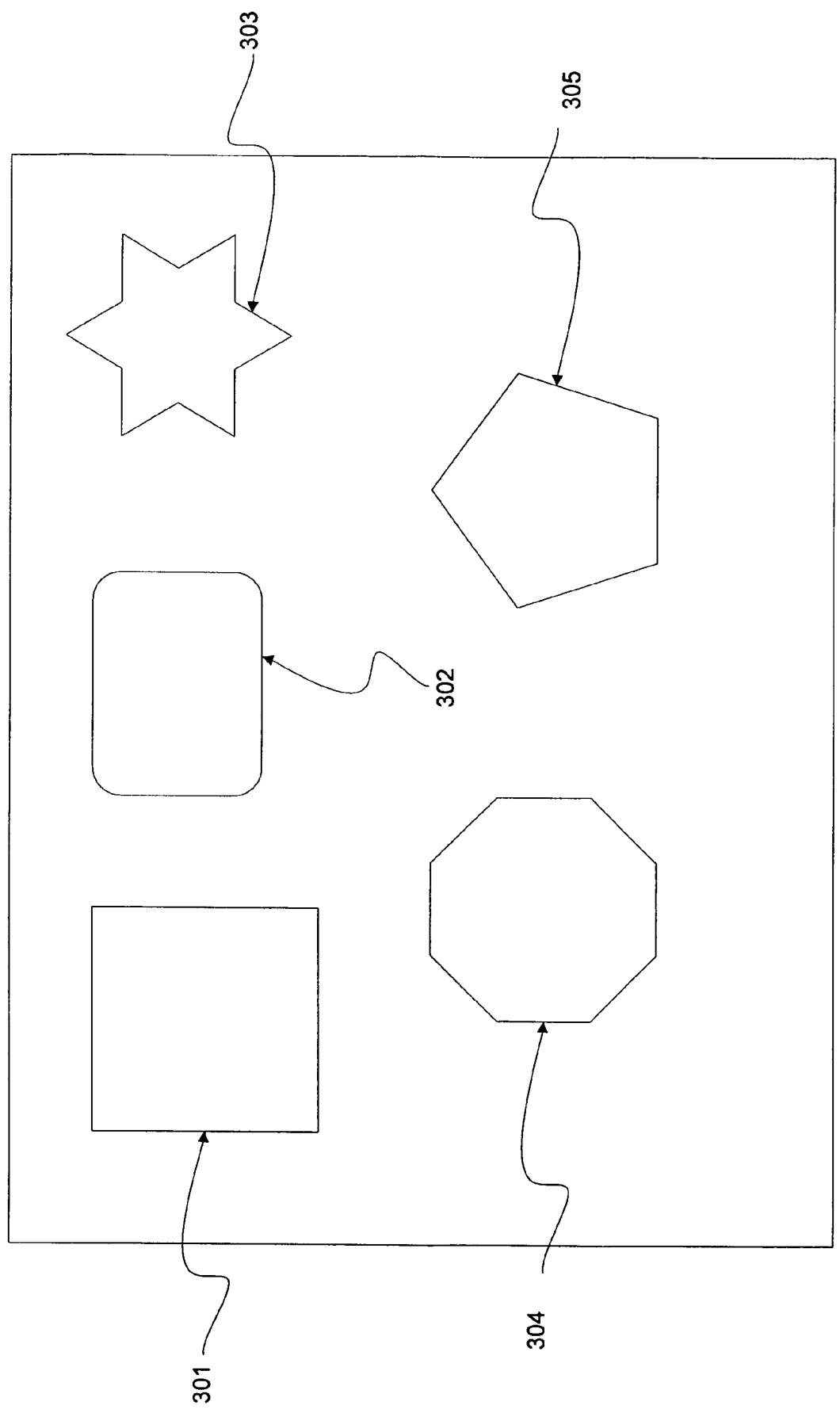
FIG. 3 is a schematic representation of a template according to a preferred embodiment.

FIG. 3 is a schematic representation of a template comprising a plurality of windows according to an embodiment. The template and windows are implemented in software or hardware. FIG. 3 depicts 5 windows—more or less can be used. The windows 301, 302, 303, 304, and 305 of FIG. 3 are of varying shapes and dimensions. As explained above, they can be of the same shape and/or dimensions as appropriate, and it is envisaged that a user can have the choice of numerous templates in which such window shapes and/or dimensions vary, and in which window shapes and/or dimensions can be adjusted automatically or by a user. The templates can have different 'themes' as is customary in the art.

The user can examine the allocation of images, using display 101 for example or other suitable display, in order to determine which of the images allocated to respective ones of the windows of the template by the allocation algorithm are acceptable. According to an embodiment, the user can then select allocated images which are acceptably allocated. Such a selection can be effected in a number of ways. For example, a user can simply 'click' on an acceptable image using an input device such as mouse 103 or similar, or if display 101 is a touch sensitive display, an acceptable image can be selected by touching the appropriate portion of the display with a finger or other suitable pointing/selection device. The selection can be effected by ticking a box under or around the window which contains the image in question, for example, or highlighting the image, or manually inputting a number or similar image identifier which denotes the image to be flagged. Other alternatives are possible.

The selection of an image whose allocation is acceptable effectively flags the image so that further processing of images in the template in question affects the flagged image differently to an un-flagged image. According to an embodiment, a user flags one or more images whose allocation is acceptable, and then initiates a further allocation using the rule-based algorithm which initially allocated the images. Any flagged images remain in the template, and are not affected by the subsequent allocation procedure. Any images which were not flagged will be replaced by other images. This process can be repeated until the template comprises images in all windows which are acceptable to the user. Hence, the user can select images in the template which have been allocated in such a way as to be acceptable to the user, which selection prevents the acceptable image(s) from being replaced in any subsequent allocation procedures.

The method outlined above allows a user to interact with an automatic allocation of images using a rule-based scheme, and provides a method whereby the user can 'hold' images that are acceptably allocated or positioned whilst effectively filtering out other images until all windows comprise images which are acceptable. Note that the method can work equally well with other automatic systems of allocating images to specific windows in a template, and the rule-based scheme described above is not intended to be limiting.

According to a further embodiment, instead of applying a 'hold' flag to an image which is deemed to be acceptably allocated in a template (i.e. selecting an image to maintain it in the template), a user can have the option of applying two or more flags to an image or images. Respective flags applied to an image can have respectively different effects in terms of the subsequent processing of images in the template. For example, one of the flags can be the 'hold' flag as described above in which, if an image has been acceptably allocated by the allocation algorithm (or similar), the selection of the image with a 'hold' flag causes that image to remain in its window during a subsequent allocation procedure. Another flag which could be applied to an image (including one which already has a 'hold' flag), can be one which permits different croppings of the image to be displayed. For example, the shape and/or dimensions of the window in which the image is displayed can be altered. Other alternatives are possible, and the provision of applying more than two flags to an image is possible in order to effect a plurality of processing to images in a template. Crop variants (i.e. variations of the size and/or dimensions of a window in which an image is displayed) can be varied during an allocation procedure, or at another time either before or subsequent to an allocation procedure. Preferably, when a suitable crop variant is found, an image can simply be held, without adding a secondary crop variation flag, and the image, and the desired crop variation will be maintained.

An additional flag which can be used can provide a way for a user to indicate that an allocated is acceptable in the montage, but that the position (i.e. the template window) to which it has been allocated is not acceptable. In this way, an image which this flag will be maintained in the montage, but its position within the montage can be varied by the system. Preferably, this flag remains in an unselected state following each allocation procedure.

The user interface of the system used to allocate the images can thus be likened to a 'one-armed bandit' system, in which items which are not held are iterated until a desired allocation of items is reached. The user interface can be designed in such a way to exploit the user's knowledge of the electronic gaming machine model. For example, a user interface 'button' to initiate an iteration of the allocation algorithm can be in the form of an arm on such machines. Other alternatives are possible.

Figure 4:
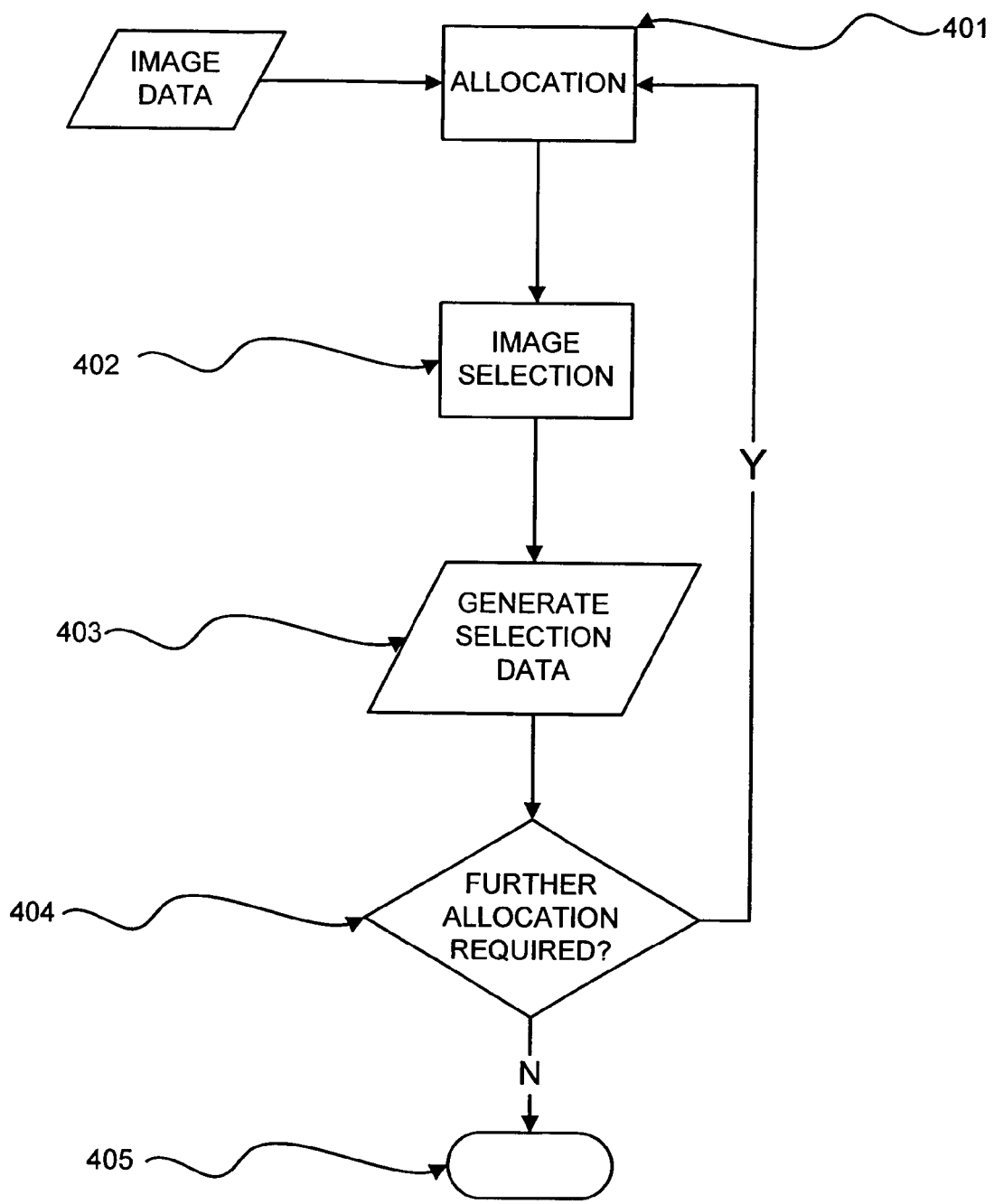
FIG. 4 is a flow diagram representing an exemplary procedure for generating an image montage according to an embodiment.

FIG. 4 is a flow chart representing an exemplary procedure by which the selection and iteration of images in a template can proceed. At step 401 an initial allocation of images into the windows of a selected template is performed. The template can be chosen by a user, or can be selected by the system either randomly, or based on previous user template preference and/or in relation to the plurality of images to be arranged. The initial allocation proceeds after each image has been processed in order to generate allocation data for it. As explained above, the allocation data can relate to image content and/or size etc and provides a measure for each image of its relative 'importance' compared to the other images. Alternatively, allocation can be random, in which case it is not necessary to process the images initially—they can merely be allocated, perhaps with the proviso that an image is not allocated to two or more positions in the template at the same time, for example. Images determined as more important, or having a higher score following any processing, will be allocated in preference to those of less importance or with lower scores. The exact position in the template to which an image is allocated can be based on its allocation data, or can be random. As an example, an image with a higher score can be placed near the centre of the template where it is more likely to be seen quickly. Other alternatives are possible.

At step 402, once images have been allocated, a user selects which, if any, of the allocated images they would like to remain in the positions of the template they have been allocated to. As explained above, this can be effected in a number of ways, such as selecting the desired image(s), or ticking a box relating to the image(s) for example. Many other known ways exist for selection of objects in a user interface.

At step 403, selection data is generated based on the user selection. The selection data includes data representing the image which has been selected, and can include data representing the current position in the template to the selected image.

Once the user has selected any images whose placement in the template they are happy with, the system determines whether a further allocation of images is required at step 404. More specifically, if it is determined at step 404 that all images have been selected by a user, the allocation process terminates (405), i.e. if there are no unselected images, the process ends, as it is determined that all the images in the template have, at some point, been 'held' (i.e. selected) by the user, and that the user was thus happy with their placement. Further processing of the images in the template can be performed as is explained below following termination. If, however, it is determined that there is at least one image in the template which has not been selected, a further allocation procedure can take place.

If appropriate, the further allocation procedure is initiated at step (401). The further allocation procedure replaces any images in the template which have not been selected (flagged) by the user with other images. Images used for replacement can be placed in the template on the basis of their allocation data or randomly. Any other processing can also be applied, such as varying the crop of a window for example.

An image which has at some point been selected (i.e. 'held') will not subsequently be removed from the template by the system, unless it receives direct instruction from the user to do so. Hence, a selected image remains in the template position in which it was selected, and does not need to be reselected during further iterations of the allocation procedure.

In general, the system will not replace an image which has not been selected with an already allocated image in order to prevent image duplication in a generated montage.

Once a montage has been generated, further processing of images within the montage can be effected. For example, images in the montage can be evaluated in order to determine salient portions thereof using known techniques, and the portions can then be used to provide a visual tour of the image whilst it is in situ in the montage. Other alternatives are possible. For example, a user of the system can perform image manipulation in order to zoom into a desired portion of an image for example.

The invention claimed is:

1. A method for processing image data representing a plurality of images, the method comprising:
processing the image data for respective ones of the images in order to generate allocation data for each image;

automatically selecting, by a computer, a set of images for allocation in a template based on the allocation data;

on the basis of the allocation data, allocating, by the computer, an image, from the selected set of images, in a position in the template, the template comprising a plurality of image windows, each window representing a template position;

on the basis of user input, generating selection data representing a user selected allocated image; and for an unselected allocated image, replacing that image with another image allocated from the plurality of images.

2. A method as claimed in claim 1, wherein the allocation data is generated using a set of rules for determining at least one image attribute.

3. A method as claimed in claim 1, wherein allocation data for an image provides a measure of at least one of an image content, size, orientation, date of capture.

4. A method as claimed in claim 1, wherein an image is replaced with an image from the plurality of images based on the allocation data of the replacement image.

5. A method as claimed in claim 4 wherein the replacement image is not an image currently selected and/or allocated.

6. A method as claimed in claim 1, further comprising the step of:

on the basis of further user input for an allocated and user selected image, generating crop data for the image indicating that a crop of the image can be varied.

7. A method for generating an image montage, the method comprising:

automatically selecting, by a computer, a set of images for allocation in a montage template;

allocating, by the computer, respective ones of images from a plurality of images in the selected set of images to respective positions within windows of montage template;

determining if any of the allocated images are to be maintained in the montage, and selecting any such images; and on the basis of the determination, replacing an unselected image in the montage with an image allocated from the image set.

8. A method as claimed in claim 7, wherein an image for allocation is automatically selected from the image set at random by the computer.

9. A method as claimed in claim 7, wherein the determination and selection of images to be maintained in the montage is performed by a user.

10. A method as claimed in claim 7, wherein a replacement image is an image which has not been allocated.

11. A method as claimed in claim 7, wherein an image is automatically allocated by the computer on the basis of any one of a determined image content and/or image size and/or dimensions and/or date of capture and/or location of capture, or randomly.

12. A method as claimed in claim 7, further comprising:

determining if an image is to be maintained in a window of different size and/or shape to that in which it was originally allocated; and on the basis of the determination, varying the size and/or shape of the original window for the maintained image.

13. An image capture apparatus comprising a processor and a memory having stored thereon computer-readable code operable to perform the method as claimed in claim 1 when executed by the processor.

14. An image capture apparatus comprising a processor and a memory having stored thereon computer-readable code operable to perform the method as claimed in claim 7 when executed by the processor.

15. A computer-readable medium having computer executable program code embodied thereon, said computer executable program code, when executed by a computer, implementing a method for generating an image montage, said computer executable program code comprising a set of instructions for:

automatically select a set of images for allocation in a montage template;

allocate respective ones of images from a plurality of images in the selected set of images to respective positions within windows of the montage template;

determine if any of the allocated images are to be maintained in the montage, and select any such images; and on the basis of the determination, replace an unselected image in the montage with an image allocated from the image set.

* * * * *